United States Patent
Chang et al.

(10) Patent No.: US 6,862,139 B2
(45) Date of Patent: Mar. 1, 2005

(54) REAR PROJECTION SCREEN, OPTICAL COMPONENT THEREOF, AND METHOD FOR MANUFACTURING THE OPTICAL COMPONENT

(75) Inventors: Jen-Huai Chang, Changhua (TW); Jyh-Horng Wang, Taipei (TW); Jui-Hsiang Chang, Hualien (TW)

(73) Assignee: Prodisc Technology Inc., Taipei (TW)

( * ) Notice: Subject to any disclaimer, the term of this patent is extended or adjusted under 35 U.S.C. 154(b) by 0 days.

(21) Appl. No.: 10/409,095

(22) Filed: Apr. 9, 2003

(65) Prior Publication Data

US 2004/0120038 A1 Jun. 24, 2004

(30) Foreign Application Priority Data

Dec. 18, 2002 (TW) ........................... 91136457 A

(51) Int. Cl.$^7$ ................ G03B 21/60; G02B 27/10
(52) U.S. Cl. ............... 359/453; 359/457; 359/619; 359/628
(58) Field of Search ................ 359/455, 456, 359/457, 619, 628

(56) References Cited

U.S. PATENT DOCUMENTS

| | | | |
|---|---|---|---|
| 3,218,924 A | * 11/1965 | Miller | 359/456 |
| 3,712,707 A | * 1/1973 | Henkes, Jr. | 359/457 |
| 4,509,823 A | * 4/1985 | Moriguchi et al. | 359/457 |
| 4,525,029 A | * 6/1985 | Inoue et al. | 359/457 |
| 4,566,756 A | * 1/1986 | Heijnemans | 359/457 |
| 4,647,519 A | * 3/1987 | Speigel | 359/456 |
| 4,927,233 A | * 5/1990 | Nakanishi et al. | 359/456 |
| 4,979,801 A | * 12/1990 | Park | 359/457 |
| 5,066,099 A | * 11/1991 | Yoshida et al. | 359/457 |
| 5,121,252 A | * 6/1992 | Okada et al. | 359/455 |
| 5,184,224 A | * 2/1993 | Mitani et al. | 359/456 |
| 5,815,313 A | * 9/1998 | Mitani et al. | 359/456 |
| 5,870,224 A | 2/1999 | Saitoh et al. | 359/456 |
| 6,275,334 B1 | * 8/2001 | Park | 359/457 |

* cited by examiner

Primary Examiner—Christopher E Mahoney
(74) Attorney, Agent, or Firm—Birch, Stewart, Kolasch & Birch LLP

(57) ABSTRACT

A rear projection screen includes a first and second optical components. The second optical component includes a first surface on which a plurality of cylindrical convex portions are formed, and a second surface opposite to the first surface. In this case, a plurality of concave portions are formed on the second surface, and each concave portion is positioned respectively corresponding to the place between each cylindrical convex portion. A light absorbing material is applied to each concave portion. Furthermore, the invention also discloses an optical component and a method for manufacturing the optical component.

21 Claims, 8 Drawing Sheets ical component used in the screen, and a manufacturing method of the optical component and, in particular, to a rear projection screen, an optical component used in the rear projection screen, and a method for manufacturing the optical component.

REAR PROJECTION SCREEN, OPTICAL COMPONENT THEREOF, AND METHOD FOR MANUFACTURING THE OPTICAL COMPONENT

BACKGROUND OF THE INVENTION

1. Field of Invention

The invention relates to a screen, an optical component used in the screen, and a manufacturing method of the optical component and, in particular, to a rear projection screen, an optical component used in the rear projection screen, and a method for manufacturing the optical component.

2. Related Art

As the acceptance of HDTVs and DVD players has grown widespread, the image quality of large size displays has become increasingly important. Recently, rear projection screens are well developed. In a rear projection screen, images are projected on a screen and then are outputted to an audience. Therefore, it is very important to consider the view angles, the contrast and resolution of the images, and the brightness when designing the rear projection screen.

With reference to FIG. 1, a conventional rear projection screen 1 includes a Fresnel lens 10 and a lenticular lens 11. In this case, the lenticular lens 11 has a light entrance surface 110 and a light exit surface 111. The light entrance surface 110 has a plurality of cylindrical convex portions 110a. The light exit surface 11 is a planar surface. In order to increase the contrast and resolution of rear projection screen 1, the lenticular lens 11 might be tinted to absorb interference and scattered light in the environment.

In addition, the lenticular lens 11 may be mixed with light diffusing beads 120 to increase the view angle of the rear projection screen 1. However, while the lenticular lens 11 is tinted, the brightness and chromatic aberration may worsen.

To solve the above mentioned problems, referring to FIGS. 2A, 2B and 2C, U.S. Pat. No. 5,870,224 disclosed a rear projection screen 2 having a Fresnel lens 20 and a lenticular lens 21. The lenticular lens 21 has a light entrance surface 210, and a plurality of cylindrical convex portions 210a are formed on the light entrance surface 210. The lenticular lens 21 further has a light exit surface 211, which is a planar surface. Moreover, a transparent film 220 is provided on the light exit surface 211, and a plurality of light absorbing layers 230 are formed on the transparent film 220. In addition, a light diffusing layer 240 is formed on the light absorbing layers 230. As mentioned above, the interference and scattered light can be absorbed, and the view angle of the rear projection screen 2 can be increased. However, when an incident light 2000 passes through the light entrance surface 210, focuses on the light exit surface 211, and is scattered out of the lenticular lens 21, the light absorbing layers 230 may block the scattered light 2001. Thus, the brightness of the rear projection screen 2 is induced. Accordingly, the width and height of light absorbing layers 230 are limited. It should be noted that when the thickness of the lenticular lens 21 is produced incorrectly during the manufacturing process, the incident light 2000 might not focus on the light exit surface 211 accurately. Then, the brightness of rear projection screen 2 is further induced, and the width of light absorbing layers 230 must be further contracted to overcome this problem.

In addition, as shown in FIG. 2C, since the width of light absorbing layer 230 is limited, the interference light 2002 may penetrate through part of the light exit surface 211 without light absorbing layers 230 from environment, and turn into the reflecting light 2003 from the lenticular lens 21 through part of the light exit surface 211 without light absorbing layers 230. Therefore, the contrast and resolution of the rear projection screen 2 may be reduced.

U.S. Pat. No. 5,870,224 also disclosed a method for manufacturing a lenticular lens. In this case, an ultraviolet-sensitive resin film is coated on the transparent support film. Then, several light beams illuminate the lenticular lens. The lenticular lens focuses the light beams away from some regions and towards other regions of the ultraviolet-sensitive resin film. The regions onto which ultraviolet light beams are focused become the non-adhesive portions; the regions on which the ultraviolet light beams are focused away are the adhesive portions. According to this method, the light beams must be in parallel before passing through the light entrance surface, or a light mask is required to control the pitches of non-adhesive portions and adhesive portions. Accordingly, the fabricating of the lenticular lens becomes difficult and complex.

Hence, it is an important subject of the invention to absorb the interference and scattered light for increasing the brightness of the rear projection screen, to enlarge the area of light absorbing material for improving contrast and resolution of a rear projection screen, and to simplify the manufacturing processes of a lenticular lens.

SUMMARY OF THE INVENTION

In view of the above-mentioned problems, an objective of the invention is to provide a rear projection screen, which has improved brightness, contrast and resolution.

It is another objective of the invention to provide an optical component used in a rear projection screen, which has improved brightness, contrast and resolution.

The invention is characterized by providing a plurality of concave portions on the surface of the optical component used in the rear projection screen. Each concave portion is further applied with a light absorbing material for absorbing interference and scattered light from the environment. Moreover, the area of each concave portion is enlarged, so that the contrast and resolution of the rear projection screen are improved.

To achieve the above-mentioned objective, the invention provides a rear projection screen including a first optical component and a second optical component. In the invention, the second optical component has a first surface and a second surface opposite to the first surface. The first surface has a plurality of cylindrical convex portions, and the second surface has a plurality of concave portions. Each of the concave portions corresponds to each of the cylindrical convex portions of the first surface and between each cylindrical convex portion. In addition, a light absorbing material is applied to each of the concave portions. Furthermore, the invention also provides an optical component, which is similar to the mentioned second optical component, used in the rear projection screen.

The invention also discloses a method for manufacturing an optical component, including the following steps. First, a raw material is provided. Next, a pair of relative rollers is used to form the raw material into a plate optical component. The plate optical component has a first surface and a second surface opposite to the first surface. The first surface has a plurality of cylindrical convex portions, and the second surface has a plurality of concave portions. Each of the concave portions corresponds to each of the cylindrical convex portions of the first surface and between the cylindrical convex portions. Finally, a light absorbing material is applied to the concave portions.

As mentioned above, since the surface of the optical component has concave portions to which the light absorbing material is applied, the interference and scattered light from the environment can be absorbed efficiently. In addition, since the light absorbing material is applied to the concave portions, the area of the light absorbing material can be increased while the area of concave portions is increased. Therefore, the contrast and resolution of the rear projection screen of the invention can be improved.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The rear projection screen, the optical component used in the rear projection screen, and the method for manufacturing the optical component according to the preferred embodiment of the invention will be described hereinbelow with reference to the accompany drawings, wherein the same reference numbers refer to the same elements.

Figure 1:
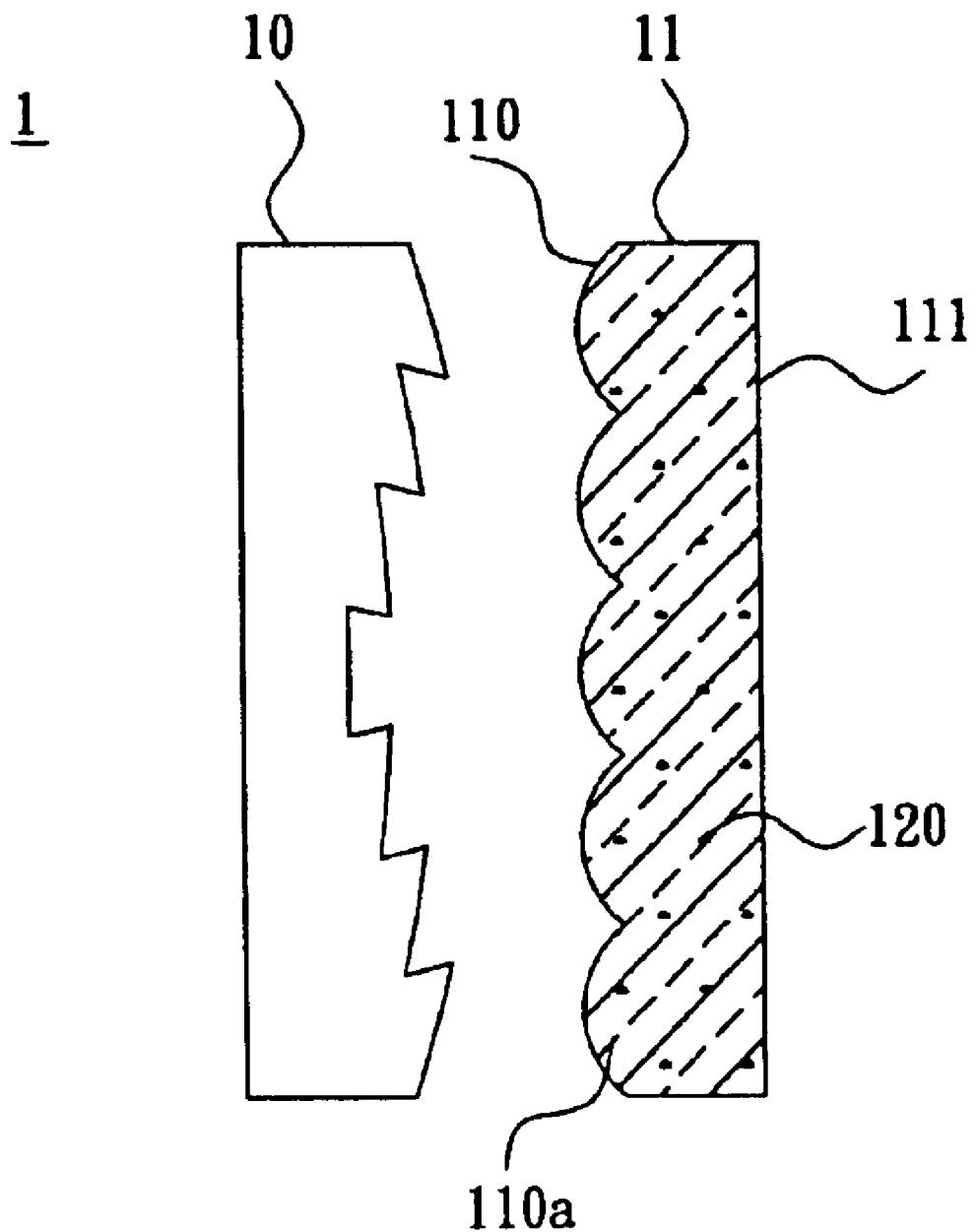
FIG. 1 is a schematic diagram showing a cross sectional view of the conventional rear projection screen.
Figure 2A:
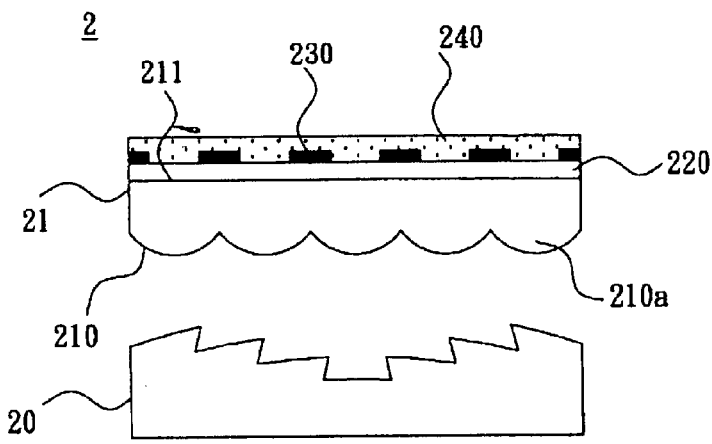
FIG. 2A is a schematic diagram showing a cross sectional view of another conventional rear projection screen.
Figure 2B:
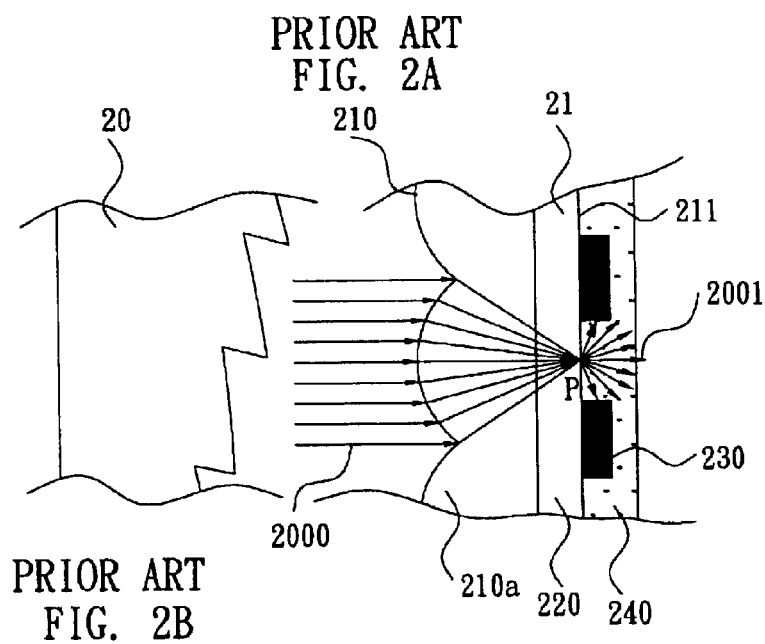
FIG. 2B is a schematic diagram showing a partial view of the conventional rear projection screen of FIG. 2A and the incident light.
Figure 2C:
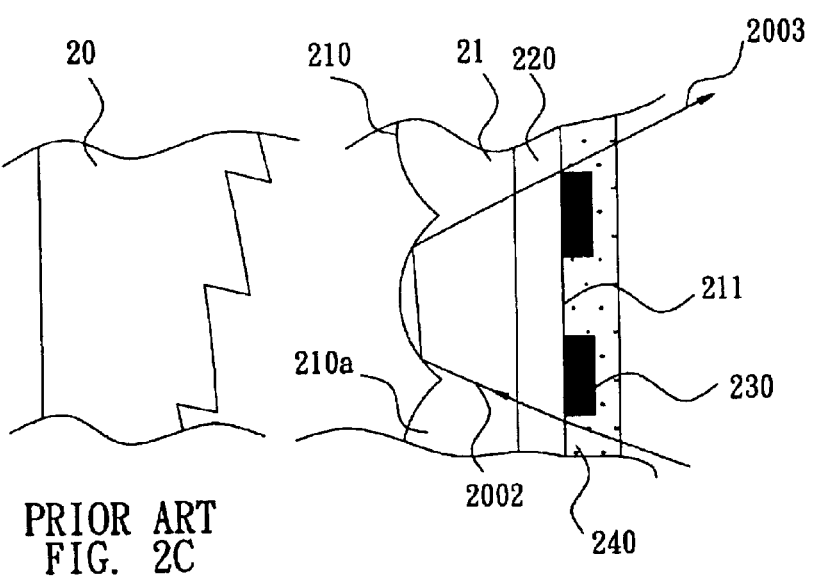
FIG. 2C is a schematic diagram showing a partial view of the conventional rear projection screen of FIG. 2A and the interference light.
Figure 3A:
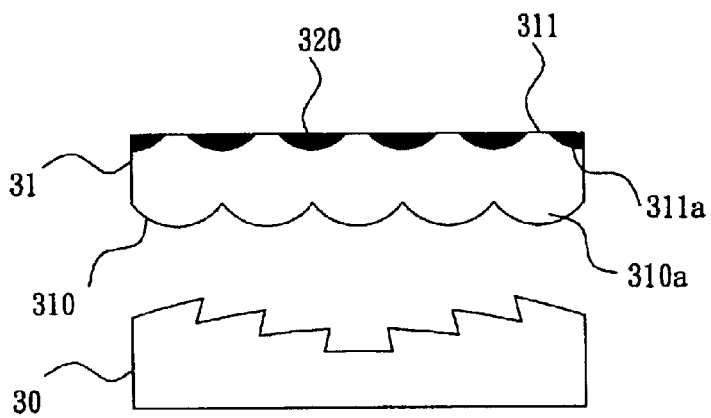
FIG. 3A is a schematic diagram showing a cross sectional view of a rear projection screen according to a preferred embodiment of the invention.
Figure 3B:
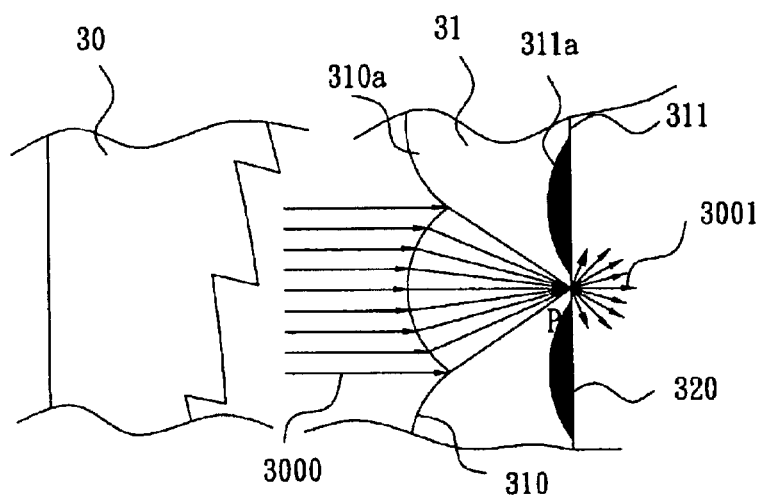
FIG. 3B is a schematic diagram showing a partial view of the rear projection screen of the invention and the incident light.
Figure 3C:
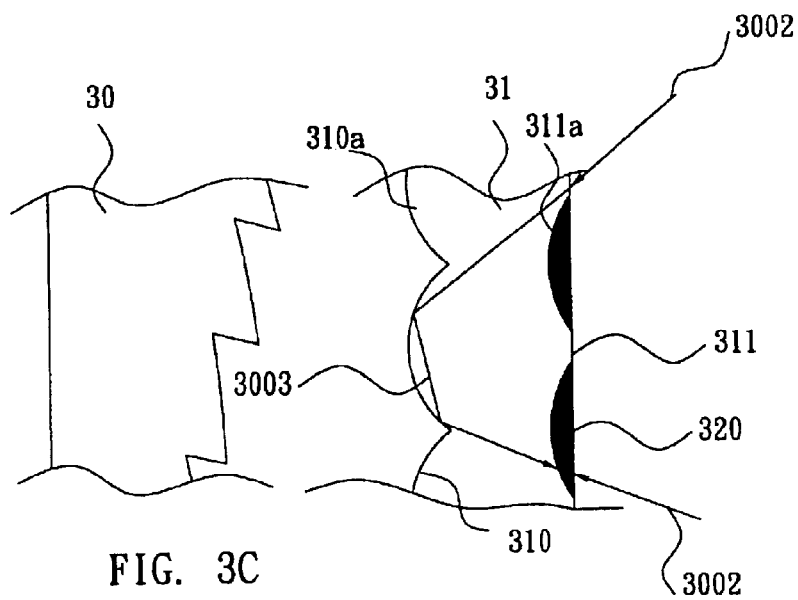
FIG. 3C is a schematic diagram showing a partial view of the rear projection screen of the invention and the interference light.

As shown in FIGS. 3A, 3B and 3C, a rear projection screen 3 according to a preferred embodiment of the invention includes a first optical component 30 and a second optical component 31.

The first optical component 30 is used for collecting light beams, so the divergent light beams can be focused and outputted into the audiences' eyes. In the embodiment, the first optical component 30 can be a Fresnel lens. In this case, the light beams are converged and outputted from the first optical component 20 in parallel.

The second optical component 31 has a first surface 310 and a second surface 311 opposite to the first surface 310. The first surface 310 is adjacent to the first optical component 30 and has a plurality of cylindrical convex portions 310a. The second surface 311 has a plurality of concave portions 311a, each of which is positioned opposite to the place between two adjacent cylindrical convex portions 310a. A light absorbing material 320 is applied to each concave portion 311a. In the current embodiment, the second optical component 31 is a lenticular lens. Thus, people skilled in the art should understand that after entering the cylindrical convex portions 310a in parallel, the incident light 3000 is focused on a spot (or a small region) between the concave portions 311a of the second surface 311. Accordingly, the width of each concave portion 311a can be increased, and the area of light absorbing material 320 can be enlarged. In this case, the scattered light 3001 would not be blocked, so the brightness of the rear projection screen 3 would not be interfered with.

Figure 4:
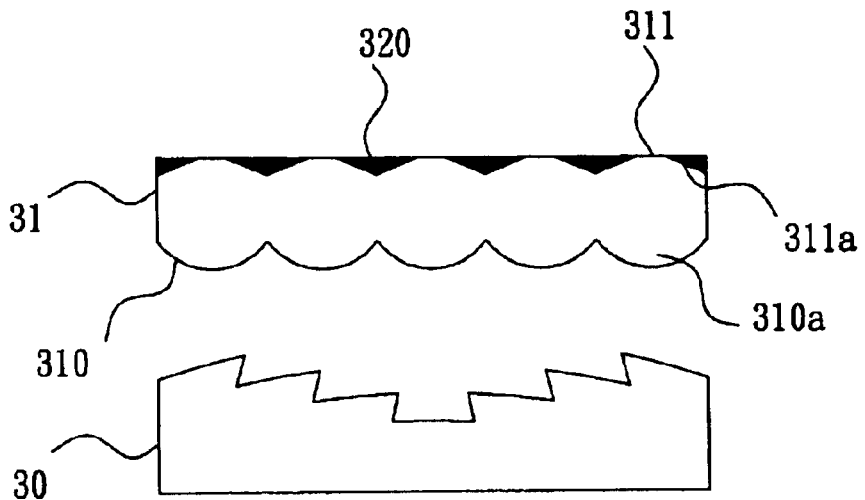
FIG. 4 is a schematic diagram showing a cross sectional view of a rear projection screen according to another preferred embodiment of the invention, wherein the shape of each concave portion is an inverted triangle.
Figure 5:
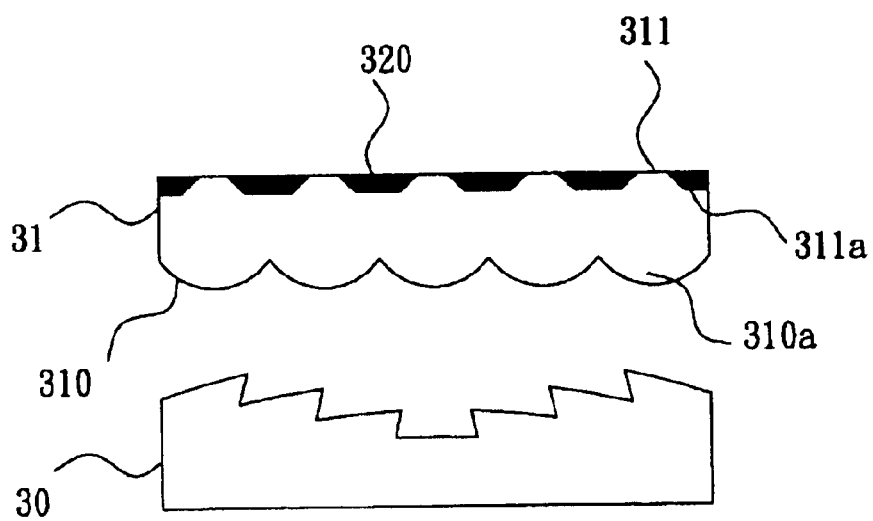
FIG. 5 is a schematic diagram showing a cross sectional view of a rear projection screen according to another preferred embodiment of the invention, wherein the shape of each concave portion is a trapezoid.

In addition, with reference to FIG. 3C, since the width of light absorbing material 320 is increased, the absorbing material 320 can absorb the interference light 3002 efficiently. Even though the interference light 3002 penetrates through part of the second surface 311, to which the light absorbing material 320 has not been applied, and turns into the reflecting light 3003, the reflecting light 3003 may not penetrate through the second surface 311 and will be absorbed by the absorbing material 320. Hence, the contrast and resolution of rear projection screen 3 can be efficiently improved. In the invention, the light absorbing material 320 can be any conventional dark printing ink, and the concave portions 311a can be filled up with the light absorbing material 320. It should be noted that the place between each concave portion 311a is a planar surface, and the shape of each concave portion 311a could be an arc, an inverted triangle (as shown in FIG. 4), a trapezoid (as shown in FIG. 5), or the likes.

Figure 6:
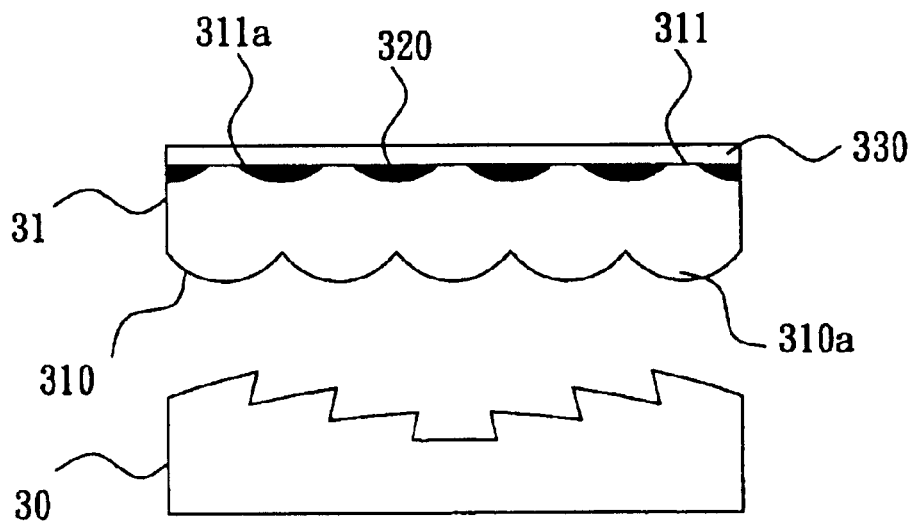
FIG. 6 is a schematic diagram showing a cross sectional view of a rear projection screen according to another preferred embodiment of the invention, wherein the second optical component has an anti-reflection layer formed on the second surface.

Furthermore, as shown in FIG. 6, an anti-reflection layer 330 is formed on the second surface 311 and absorbing material 320 of the second optical component 31. Therefore, the quality of the rear projection screen 3 is improved. It should be noted that people skilled in the art could replace the anti-reflection layer 330 with an anti-glare layer, an anti-scratch layer, an anti-static layer, or two or more layers selected from the group consisting of an anti-reflection layer, an anti-glare layer, an anti-scratch layer, and an anti-static layer.

Figure 7:
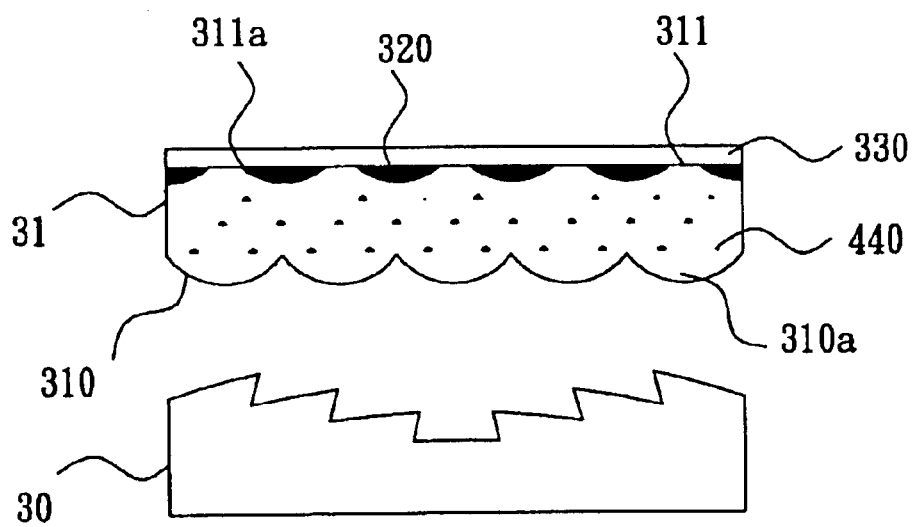
FIG. 7 is a schematic diagram showing a cross sectional view of a rear projection screen according to another preferred embodiment of the invention, wherein the second optical component has a plurality of light diffusing beads distributed inside and an anti-reflection layer formed on the second surface.

As shown in FIG. 7, the second optical component 31 can have a plurality of light diffusing beads 440 distributed inside the second optical component 31, so that the view angle of rear projection screen 3 can be increased. In this case, an anti-reflection layer 330 can also be formed on the second surface 311 and absorbing material 320 of the second optical component 31 to increase the quality of rear projection screen 3. It should be noted that the anti-reflection layer 330 can be replaced with an anti-glare layer, an anti-scratch layer, an anti-static layer, or two or more of the above mentioned layers.

Figure 8:
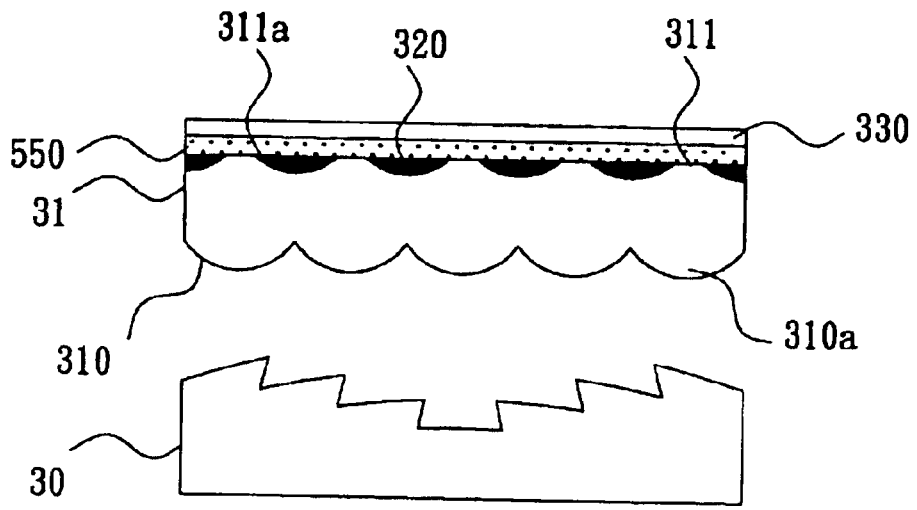
FIG. 8 is a schematic diagram showing a cross sectional view of a rear projection screen according to another preferred embodiment of the invention, wherein the second optical component has a light diffusing layer and an anti-reflection layer formed on the second surface.

Referring to FIG. 8, the second optical component 21, according to another embodiment of the invention, can have a light diffusing layer 550 formed on the second surface 311 and light absorbing material 320, so that the view angle of rear projection screen 3 can be increased. Moreover, an anti-reflection layer 330 can be formed on the light diffusing layer 550 further enhancing the quality of rear projection screen 3. It should be noted that people skilled in the art could replace the anti-reflection layer 330 with an anti-glare layer, an anti-scratch layer, an anti-static layer, or two or more layers selected from the group consisting of an anti-reflection layer, an anti-glare layer, an anti-scratch layer, and an anti-static layer.

Figure 9:
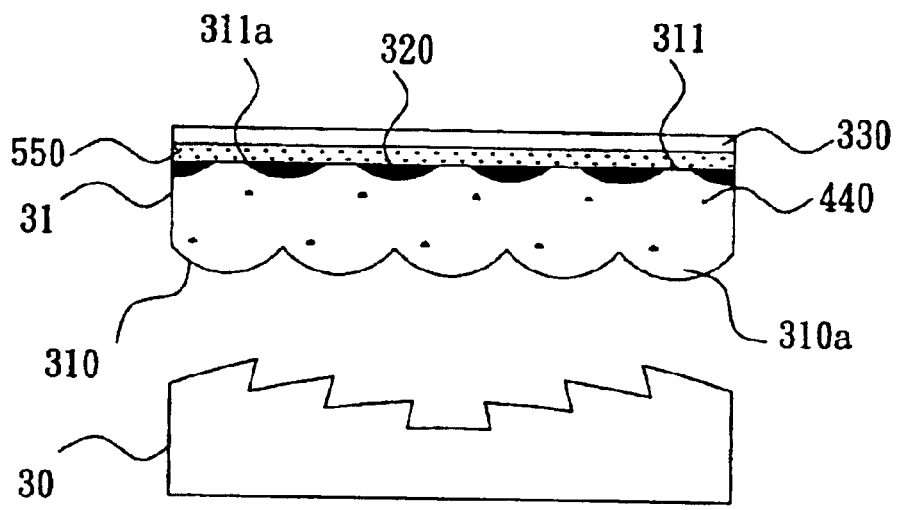
FIG. 9 is a schematic diagram showing a cross sectional view of a rear projection screen according to another preferred embodiment of the invention, wherein the second optical component has a plurality of light diffusing beads distributed inside, and has a light diffusing layer and an anti-reflection layer formed on the second surface.

Referring to FIG. 9, the second optical component 31 can have light diffusing beads 440 mixed inside and a light diffusing layer 550 formed on the second surface 311 and light absorbing material 320. In the present embodiment, the view angle of the rear projection screen 3 can be increased, and the brightness of that can also become more uniform. Moreover, an anti-reflection layer 330 can be formed on the light diffusing layer 550 for further enhancing the quality of the rear projection screen 3. It should be noted that people skilled in the art could replace the anti-reflection layer 330 with an anti-glare layer, an anti-scratch layer, an anti-static layer, or two or more layers selected from the mentioned layers.

This invention also discloses an optical component, which is similar to the second optical component 31 of rear projection screen 3. Thus, this specification would not illustrate it in more detail herein below.

The present invention is described in greater detail with reference to the following embodiment, which illustrates a method for manufacturing an optical component.

Figure 10:
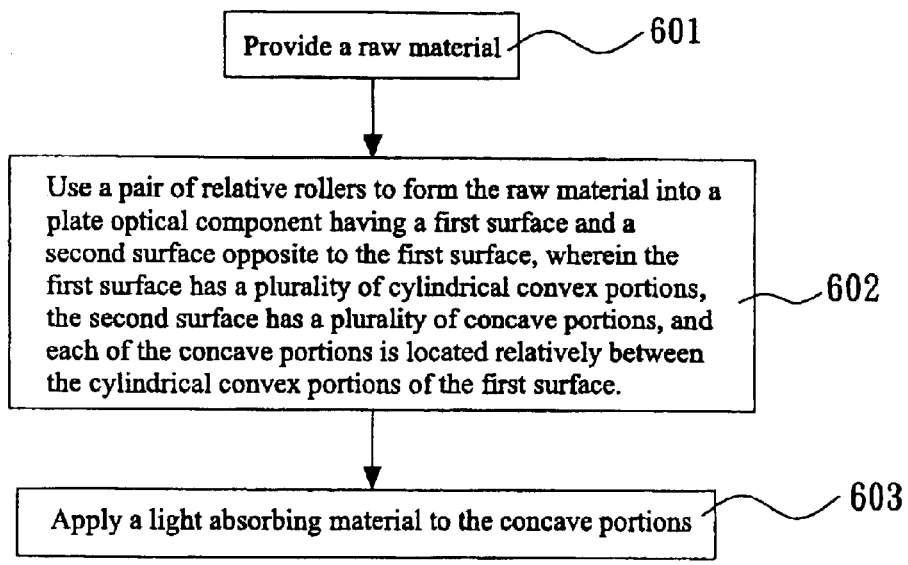
FIG. 10 is a flow chart showing a method for manufacturing an optical component according to a preferred embodiment of the invention.

Please refer to FIG. 10. First, in step 601, a raw material is provided. In the embodiment, the raw material can be made of polymethyl methacrylate (PMMA), polyethylene terephthalate glycol (PETG), polystyrene (PS), polycarbonate (PC), or any other copolymer. It should be noted that the raw material could be premixed with light diffusing beads.

Next, in step 602, a pair of relative rollers are used to form the raw material into a plate optical component having a first surface and a second surface opposite to the first surface. In the invention, the first surface has a plurality of cylindrical convex portions, and the second surface has a plurality of concave portions. Each of the concave portions is located relatively between the cylindrical convex portions of the first surface. It should be noted that the shape of each concave portion could be an arc, an inverted triangle, a trapezoid, or the likes.

In step 603, a light absorbing material is applied to the concave portions. In the present embodiment, the light absorbing material is a dark printing ink, and is filled up the concave portions. The light absorbing material can be applied by utilizing a roller coating method, a dipping coating method, or curtain coating method.

Figure 11:
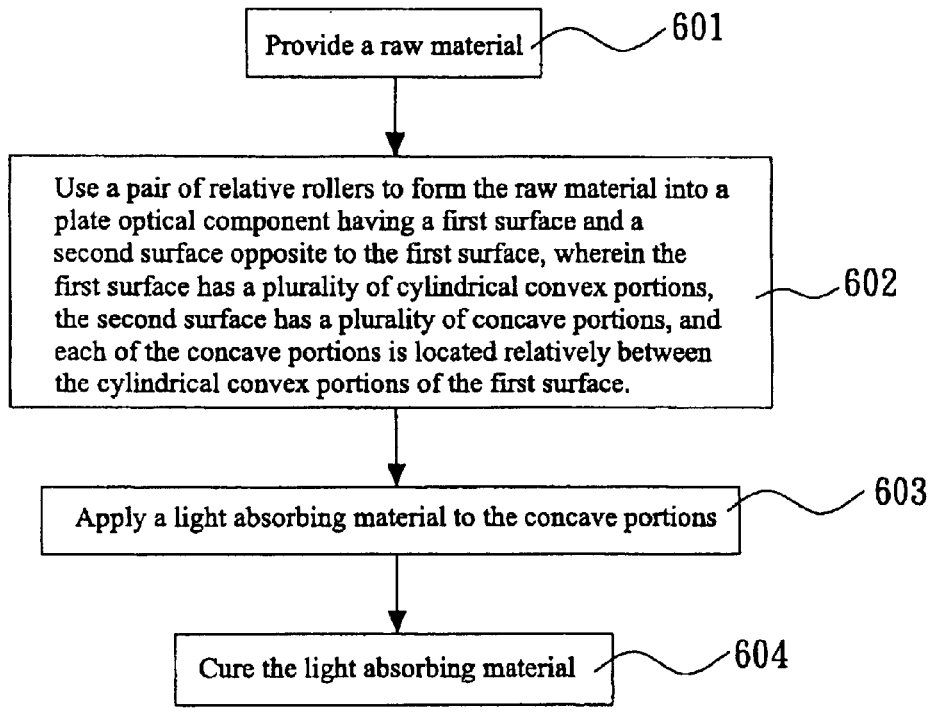
FIG. 11 is a flow chart showing a method for manufacturing an optical component according to another preferred embodiment of the invention.

Furthermore, as shown in FIG. 11, the method for manufacturing an optical component further includes a step 604 for curing the light absorbing material. In this embodiment, the absorbing material can be cured with an UV curing method, a thermal curing method, or a thermal drying method.

Figure 12:
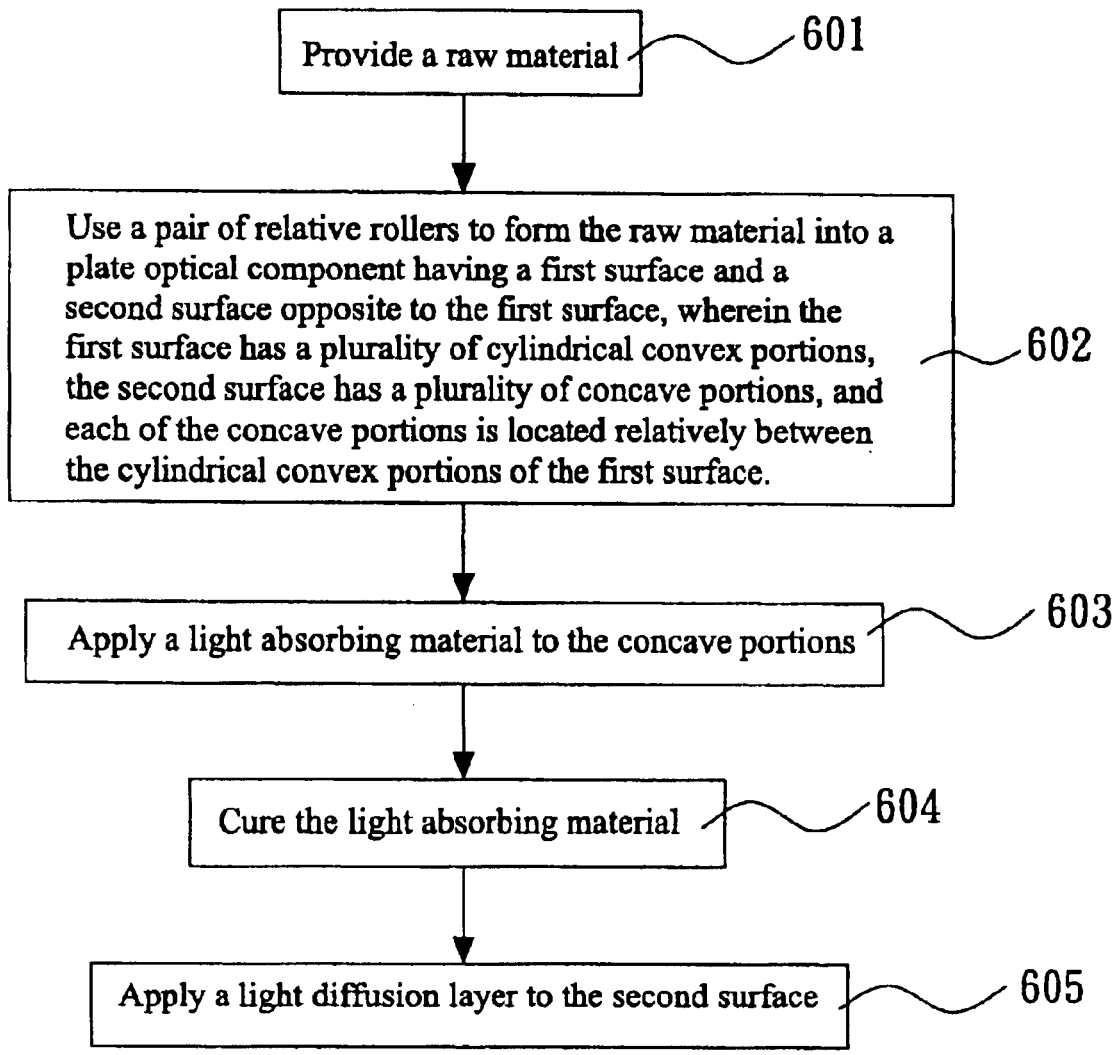
FIG. 12 is a flow chart showing a method for manufacturing an optical component according to yet another preferred embodiment of the invention.

With reference to FIG. 12, the method for manufacturing an optical component still further includes a step 605 for applying a light diffusion layer to the second surface and the light absorbing material. In this case, the light diffusing layer can be applied with conventional roller printing method. Alternatively, the light diffusing layer can be a film and be attached to the second surface.

In summary, since the second optical component of a rear projection screen or the optical component of the invention has increased region of light absorbing material, the rear projection screen of the invention has improved the contrast and the resolution. In addition, the interference and scattered light from the environment can be efficiently absorbed. Thus, the image quality of the rear projection screen of the invention can be greatly improved.

Although the invention has been described with reference to specific embodiments, this description should not mean to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A rear projection screen, comprising:
   a first optical component; and
   a second optical component, which has a first surface and a second surface opposite to the first surface, the first surface having a plurality of cylindrical convex portions, the second surface further having a plurality of concave portions, each of the concave portions being positioned respectively opposite a point joining adjacent cylindrical convex portions and being filled up with a light absorbing material;
   said concave portions being separated by plane surfaces, and a planar surface being formed from said plane surfaces and said light absorbing material.

2. The rear projection screen of claim 1, wherein the first optical component is a Fresnel lens, and the second optical component is a lenticular lens.

3. The rear projection screen of claim 1, wherein the first surface of the second optical component is adjacent to the first optical component.

4. The rear projection screen of claim 1, wherein the shape of the concave portions of the second optical component is a trapezoid.

5. The rear projection screen of claim 1, wherein the shape of the concave portions of the second optical component is an inverted triangle.

6. The rear projection screen of claim 1, wherein the shape of the concave portions of the second optical component is an arc.

7. The rear projection screen of claim 1, wherein the second optical component is mixed with light diffusing beads.

8. The rear projection screen of claim 1, wherein the light absorbing material is a dark printing ink.

9. The rear projection screen of claim 1, wherein a light diffusing layer is formed on the second surface of the second optical component.

10. The rear projection screen of claim 1, wherein an anti-reflection layer is formed on the second surface of the second optical component.

11. The rear projection screen of claim 1, wherein an anti-glare layer is formed on the second surface of the second optical component.

12. The rear projection screen of claim 1, wherein an anti-scratch layer is formed on the second surface of the second optical component.

13. The rear projection screen of claim 1, wherein an anti-static layer is formed on the second surface of the second optical component.

14. An optical component having a first surface and a second surface opposite to the first surface, wherein the first surface has a plurality of cylindrical convex portions, the optical component being characterized in that:

the second surface has a plurality of concave portions, each of the concave portions being positioned respectively opposite a point joining adjacent cylindrical convex portions and being filled up with a light absorbing material;

said concave portions being separated by plane surfaces, and a planar surface being formed from said plane surfaces and said light absorbing material.

15. The optical component of claim 14, which is mixed with light diffusing beads.

16. The optical component of claim 14, wherein the light absorbing material is a dark printing ink.

17. A method for manufacturing an optical component, comprising:

providing a raw material of the optical component;

using a pair of relative rollers to form the raw material into a plate optical component having a first surface and a second surface opposite to the first surface, the first surface having a plurality of cylindrical convex portions, the second surface having a plurality of concave portions separated by plane surfaces, each of the concave portions being positioned respectively opposite a point joining adjacent cylindrical convex portions; and applying a light absorbing material to the concave portions, a planar surface formed by said plane surfaces and said light absorbing material.

18. The method of claim 17, further comprising:
curing the light absorbing material.

19. The method of claim 17, wherein the raw material is mixed with light diffusing beads.

20. The method of claim 17, wherein the concave portions are filled up with the light absorbing material.

21. The method of claim 17, further comprising:
applying a light diffusion layer to the second surface.

* * * * *